United States Patent

[11] 3,631,674

| [72] | Inventor | Jack R. Taylor<br>Cincinnati, Ohio |
|---|---|---|
| [21] | Appl. No. | 3,797 |
| [22] | Filed | Jan. 19, 1970 |
| [45] | Patented | Jan. 4, 1972 |
| [73] | Assignee | General Electric Company |

[54] FOLDED FLOW COMBUSTION CHAMBER FOR A GAS TURBINE ENGINE
11 Claims, 5 Drawing Figs.

[52] U.S. Cl. .................................... 60/39.36,
60/39.65, 415/207, 415/210
[51] Int. Cl. .................................... F02c 3/00
[50] Field of Search ........................... 60/39.65,
39.69, 39.36; 415/207, 209, 210

[56] References Cited
UNITED STATES PATENTS

| 2,556,161 | 6/1951 | Bailey | 60/39.65 |
|---|---|---|---|
| 2,581,999 | 1/1952 | Blatz | 60/39.65 |
| 2,988,886 | 6/1961 | Hamm | 60/39.65 |
| 3,242,674 | 3/1966 | Clarke | 60/39.72 |

FOREIGN PATENTS

| 1,018,479 | 1/1966 | Great Britain | 60/39.65 |

*Primary Examiner*—Douglas Hart
*Attorneys*—Derek P. Lawrence, Thomas J. Bird, Jr., Lee H. Sachs, Frank L. Neuhauser, Oscar B. Waddell and Joseph B. Forman ABSTRACT: A folded flow combustion chamber is provided for use in an aircraft gas turbine engine. The combustion zone is angled with respect to the engine center line and the primary diffusion region partially surrounds the primary combustion zone in order to substantially shorten the overall axial length of the combustor. An annular splitter vane which surrounds a corner of the combustor divides and directs the flow into two combination diffuser-cooling passageways which surround the combustion zone. The primary combustion flame stabilization is a well developed conventional type design and the secondary air dilution system uses the crossflow penetration of conventional designs.

INVENTOR.
JACK R. TAYLOR
BY
T. J. Bird, Jr.
AGENT

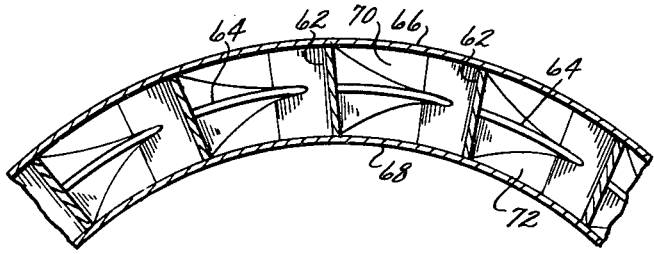
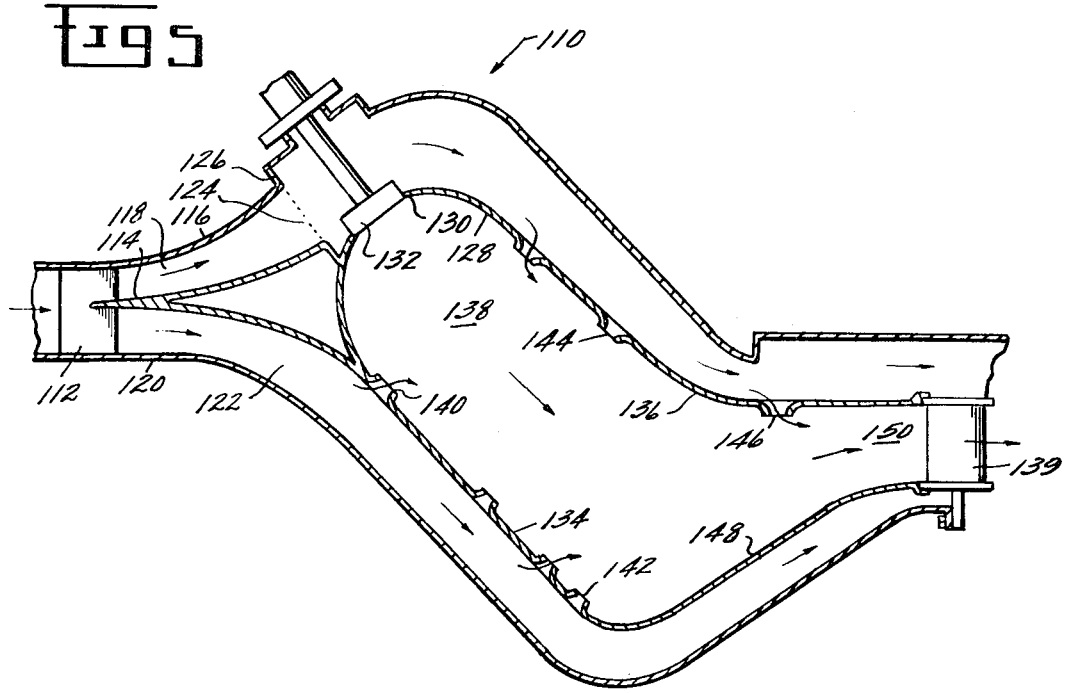

FOLDED FLOW COMBUSTION CHAMBER FOR A GAS TURBINE ENGINE

BACKGROUND OF THE INVENTION

This invention relates generally to combustion chambers for aircraft gas turbine engines and, more particularly, to a shortened, more efficient combustion chamber for use with an axial flow compressor.

Engine manufacturers are continually searching for methods and means whereby relatively compact gas turbine power plants having high power-to-weight ratios can be built more efficiently and more economically. A major problem in the production of such aircraft gas turbines is to provide machines that are shorter in length and lighter in weight than conventional machines without sacrificing performance or engine life. If such a shorter engine could be produced, it would provide a number of basic advantages. The most obvious advantage would be the reduction in the overall weight of the engine with the accompanying ability of an aircraft powered by such an engine to carry a greater payload. In addition, such an engine would require fewer main bearings and, in this respect, would be less complicated and costly than some present day engines.

Gas turbine engines of the type generally referred to here normally comprise a compressor, a primary combustion system, a turbine, a tail pipe (possibly including an augmenter combustion system), and a variable area nozzle. Conventionally, air enters an inlet and is compressed within the compressor, ignited along with high energy fuel in the primary combustion system, performs work while expanding through the turbine, and exits through the variable area nozzle. The high energy associated with gas exiting from the nozzle provides forward thrust to an aircraft powered by such an engine.

While engine manufacturers continually work on new designs in attempts to shorten each section of the above mentioned engines, the one section which one would expect to be most readily capable of reduction in length would be the primary combustion system. Typical combustors usually include an outer casing or shell, an inner liner or flame tube, and a plurality of fuel nozzles. For the most efficient utilization of the airflow received from the compressor it is necessary to achieve what is known as a "stoichiometric" burning condition in the area adjacent to the fuel nozzle. A portion of this air flow is typically used to break the fuel into fine droplets, i.e., to atomize it, in order to permit more complete intermixing to take place. Means to allow this atomizing air to enter the liner or primary zone near the injector may consist simply of a plurality of apertures or louvers surrounding a conventional atomizing fuel injector nozzle or it may consist of a spin chamber type fuel atomizer. An additional portion of the air from the compressor is then added to the primary combustion zone through additional apertures or louvers to achieve the desired stoichiometric condition.

WHEN THE DESIRED BURNING CONDITION IS ACHIEVED IN THE PRIMARY COMBUSTION AREA, THE TEMPERATURE OF THE GAS STREAM WILL RANGE BETWEEN 3,000° and 4,000° F. The most commonly used turbine blades, however, are incapable of withstanding such high temperatures. The temperature must therefore be brought down to within 1,800°-2,400° F. This is usually accomplished in the typical elongated axial flow combustor by introducing secondary or cooling air into the combustion chamber liner downstream of the primary area, in what is called a "secondary" or "mixing" zone. This approach, however, requires a combustion chamber having a relatively long inner can or long inner liner. This extra length is necessary to obtain good mixing with a sufficiently low pressure ratio from outside to inside of the liner. This low pressure drop is used to cause the relatively cool secondary airflow to penetrate the hot inner core gases, since a relatively large (e.g., on the order of 7 percent) pressure drop is undesirable as it may result in an unwanted loss in pressure head, with a subsequent loss of engine cycle efficiency. Thus, the trend in this type of combustor design has been to increase the number and/or the size of the air holes and, consequently, the length of the liner in order to obtain both the necessary air penetration and the lower (approximately 3 percent) pressure drop. Unfortunately, while this increase in length provides an efficient combustor, it also adds undesirable weight and complications as discussed above.

SUMMARY OF THE INVENTION

It is an object of this invention therefore to provide a shorter and more efficient combustor for an aircraft gas turbine engine.

It is a further object of this invention to provide a shorter combustor wherein stoichiometric burning conditions can exist and wherein a low pressure drop is provided in the secondary burning area.

Briefly stated, the objects of this invention are achieved by providing a combustor wherein the combustor inlet diffuser and the compressor outlet guide vane blade row are combined, by angling the combustor with respect to the centerline of the engine, by folding the diffusion region into the area surrounding the primary combustion zone to reduce the overall axial length while holding conventional lengths for primary combustion and for secondary diffusion zones, and finally, by overlapping the combustor dome with the major diffuser passage. The primary combustion region is similar to that of conventional combustors with the exception that the flow direction is angled with respect to the engine center line. Dilution air slots or holes are positioned around the combustor liner in such a manner as to provide effective mixing with the hot combustion gases from the primary combustion region before the flow enters a turbine located downstream of the combustor. The primary combustion flame stabilization is a well developed conventional type design and the secondary air dilution system uses the crossflow penetration of conventional designs.

DESCRIPTION OF THE DRAWINGS

While the specification concludes with a series of claims which particularly point out and distinctly claim the subject matter which applicant regards as his invention, an understanding of this invention may be gained from the following detailed description of a preferred embodiment, which is given in light of the accompanying drawings, in which:

FIG. 4 is a cross-sectional view, with portions broken away, taken along line 4—4 of FIG. 3; and FIG. 5 is a partial cross-sectional view of an alternative embodiment.

Figure 1:
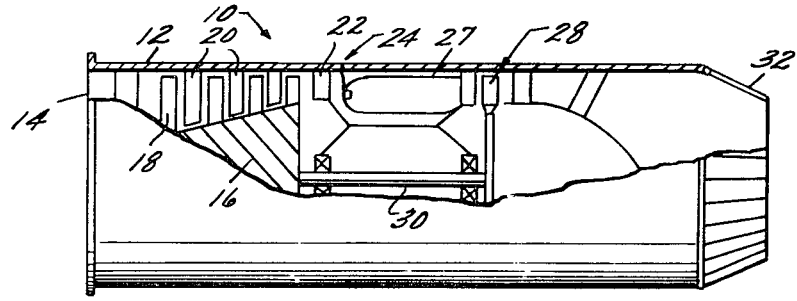
FIG. 1 is a schematic view, partially in section, of a typical aircraft gas turbine engine.

Referring now to the drawings wherein like numerals correspond to like elements throughout, reference is specifically made to Figure 1 wherein a gas turbine engine 10 includes a casing 12 forming an inlet 14, a compressor 16 having rows of rotor blades 18 interspersed between rows of stator vanes 20, which are affixed at their outer ends to the inner surface of the housing 12. At the downstream end of the compressor 16 is a row of compressor outlet guide vanes (OGVs) 22, followed by an annular diffuser passage or compressor discharge passage indicated generally at 24.

Figure 2:
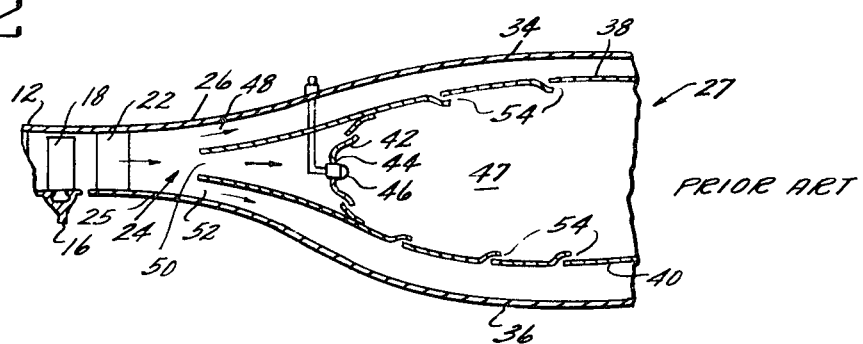
FIG. 2 is a cross-sectional view of a typical prior art combustion chamber.

The compressor discharge passage or diffuser passage 24 comprises a pair of concentric inner and outer walls 25 and 26, respectively divergent in a downstream direction as shown in FIG. 2. The diffuser passage 24 discharges the pressurized air into a combustor, indicated generally at 27, from whence the heated gases exit at high velocity to a turbine 28. The turbine 28 extracts work to drive the compressor 16 by means of a connecting shaft 30 on which both components are mounted. The hot gas stream thus generated leaves the engine through an exhaust nozzle 32, which may be of the adjustable area type. The expansion of the hot gas stream to atmospheric pressure provides thrust to an aircraft powered by the gas turbine engine 10.

Referring again to the enlarged view of Figure 2, it will be seen that the combustor 27 comprises an outer casing wall 34 and an inner casing wall 36 which are extensions of the diffuser walls 26 and 25, respectively. The outer and inner walls are spaced from a pair of outer and inner combustion chamber liners, indicated at 38 and 40, respectively. The combustion chamber liners 38 and 40 are appropriately supported within the combustor and are interconnected near their forward ends by a dome wall 42. The dome wall 42 is provided with a plurality of openings 44 for receiving fuel nozzles 46 (shown in phantom FIG. 2), which are adapted to deliver high energy fuel to a combustion zone 47.

It will be apparent from the above description that the combustor walls 34, 36 and the combustor liners 38, 40 define three concentric annular flow paths into which gas flow from the diffuser 24 is split. These flow paths are numbered 48, 50 and 52, respectively. The outer flow paths 48 and 52 provide cooling air for the combustor walls and also supply additional combustion air through liner openings 54 positioned within the liner walls 38 and 40.

As previously mentioned, the axial length of the combustor 27 is designed to provide stoichiometric burning condition within the primary combustion zone, designated 47. In addition, the combustors 27 are also made long enough to provide for good mixing with a slight pressure drop between the cooling passages 48 and 52 and the interior of the liner walls 38 and 40 at the locations of the openings 54 in order to prevent a large loss in pressure head and a subsequent loss in turbine efficiency.

Applicant's invention is adapted to provide both of the above functions while permitting shortening of the overall axial length of the combustor. With this in mind, reference is now made to FIGS. 3 and 4 wherein a combustor 60 is shown incorporating the concepts of applicant's invention. The gas flow leaving the compressor rotor enters a row of compressor outlet guide vanes 62 where it is split into two nearly equal steams by a centrally located, annular splitter vane 64. The splitter vane 64 cooperates with an outer combustor wall 66 and an inner combustor wall 68 to form two diffuser passages 70 and 72, respectively. Downstream of the annular splitter vane 64, the outer wall 66 and the inner wall 68 cooperate with the combustor liner walls 74 and 76 to form cooling passages 78 and 80, respectively. The combustor liner wall 74 is provided with a plurality of cooling or dilution holes 82, while the liner wall 76 is provided with a plurality of holes 84.

Figure 3:
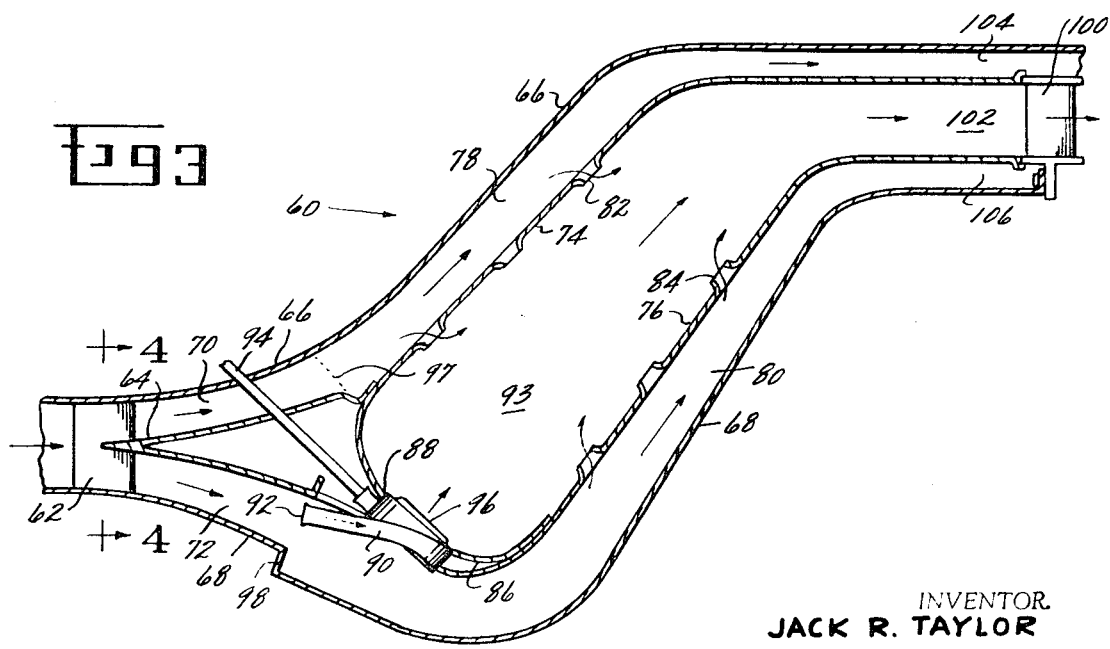
FIG. 3 is a partial cross-sectional view of a preferred embodiment of an annular combustion chamber constructed in accordance with this invention.

Located at the upstream end of the liner walls 74 and 76 is a dome portion 86 which includes a central opening 88 for receiving a fuel distribution device 90. While the fuel distribution device 90 may be of any known type, the device pictured in FIG. 3 is generally designated a scroll type vaporizer cup. The vaporizer cup includes an inlet 92 positioned within the passageway 72 for receiving a portion of the gas passing therethrough and for delivering the same to a primary combustion zone 93 formed by the combustor liners 74 and 76. The scroll cups also include a fuel tube 94 for delivering fuel to a mixing chamber wherein it is vaporized by the gas entering the inlet 92. The vaporized mixture is delivered to the combustion chamber 93 through an outlet 96. For a more complete description of a scroll type vaporizer cup, reference is made to applicant's copending application, Ser. No. 816,985, entitled "Fuel Delivery Apparatus," and assigned to the same assignee as the present invention (GE Docket 13D-5067).

In operation, air is delivered from the compressor 16 to the compressor outlet guide vanes 62 from which it is split into approximately equal portions by the annular splitter vane 64. The gas stream within the diffuser passage 70 is turned outwardly and is diffused slightly prior to a sudden expansion caused by widening of the passage 70 at the upstream end of the liner wall 74. This location is generally designated by the dotted line 97. Similarly, the inner gas stream passes through the diffuser passage 72 and is turned inwardly slightly and diffused to a lower velocity before it also is suddenly expanded due to an increase in area caused by a lip 98 which is formed within the wall 68 just downstream of the inlet 92. The sudden increases in area within the passageways 70 and 72 causes a further reduction in the velocity of the gas flowing therethrough and thereby results in a further decrease in the pressure of the gas flowing within the cooling passage 78 and 80. This reduction in velocity permits the number and the size of the dilution holes 82 and 84 to be increased to the point wherein secondary airflow is sufficient for reducing the temperature of the gas leaving the combustor through an outlet 102 to a level wherein a turbine located downstream of the combustor can withstand it. With this design, sufficient secondary airflow can be obtained with a small enough pressure drop (on the order of 3 percent) across the dilution holes 82 and 84, to prevent significant reduction in pressure head.

A portion of the air flowing through the passageway 72 enters the inlet 92 of the fuel injection device 90 and is mixed therein with fuel as previously discussed. The remaining portion of gas flowing through the passageway 72 is greatly diffused by the expansion at the lip 97 and is thereafter delivered to the cooling passageway 80. From there, approximately 25 percent of the total airflow passes through the dilution holes 84 and mixes with the hot combustion gases from the primary combustion zone before this flow enters turbine nozzle 100 through an outlet 102. Similarly, the gas passing through the passageway 70 is expanded at the region 97 and a portion thereof passes through the dilution holes 82 for the above stated reason. The remainder of the cooling air is delivered through outlets 104 and 106 downstream to cool certain portions of the turbine. The optimum arrangement and size of the dilution holes 82 and 84 are determined by combustion testing.

Referring now to FIG. 5, an alternative embodiment of applicant's combustor is designated with the numeral 110. Air once again exits a compressor (not shown) through a row of outlet guide vanes 112 where it is split into two nearly equal streams by a centrally located splitter vane 114. The splitter vane 114 cooperates with an outer wall 116 to form an outer diffuser passageway 118 and further cooperates with an inner wall 120 to form an inner diffuser passageway 122. The outer passageway 118 gradually increases in area as one moves downstream from the leading edge to the trailing edge of the splitter vane 114 (from left to right in FIG. 5). The area of the passageway 118 then suddenly increases (at a location labeled by a dotted line 124) due to a lip 126 in the outer wall 116 and further due to the ending of the splitter vane 114.

Located within this enlarged portion of the passageway 118 is a conventional combustor dome 128 which includes a central opening 130 for receiving a conventional atomizing fuel nozzle 132. Extending from the combustor dome 128 are an inner and outer liner wall designated 134 and 136, respectively. The inner liner wall 134 and the outer liner wall 136 cooperate with the combustor dome 128 to form a combustion zone 138 wherein a portion of the gas stream leaving the compressor is ignited with high energy fuel delivered by the fuel nozzles 132 to form a high energy gas stream which is delivered to a turbine nozzle 139 located downstream of the combustion zone. The inner liner wall 134 is provided with a plurality of primary air holes 140 located just downstream of the splitter vane 114 to receive a percentage of the gas flow from the inner diffuser passageway 122. The inner liner wall 134 is further provided with a plurality of secondary air dilution air slots 142, the purpose of which will become apparent. Similarly, the outer liner wall 136 is provided with a plurality of dilution air slots designated 144 and 146.

As is clearly shown in FIG. 5, the combustor dome 128 and the inner and outer liner walls 134 and 136 are angled with respect to the engine center line. This permits the inner and outer liner walls 134 and 136 to be approximately equal in length to normal axial length combustor liner walls, while the overall axial length of the combustor 110 is considerably shortened. A description of the operation of the combustor 110 will show that the overall efficiency of the combustor is as good as or better than the efficiency of conventional axial flow combustors in spite of the fact that the overall length, and thus the gross weight, of the combustor 110 is considerably less than that normally associated with axial flow combustors.

In operation, the gas flow leaving the compressor rotor enters the compressor outlet guide vanes 112 where it is split into two nearly equal streams by the centrally located splitter vane 114. The outer stream is turned outwardly within the passageway 118 and diffused slightly to a lower velocity before the sudden expansion of the passageway at the lip 126. This sudden expansion results in greater diffusion and even lower velocities just ahead of the combustor dome 128. The inner gas stream within the passageway 122 is also diffused to a lower velocity to facilitate redistribution of this flow into the primary air holes 140 and the secondary dilutions holes 142. The area of the diffusion passageway 122 and the positioning and sizing of the secondary dilution holes 142 provide a sufficiently small pressure gradient across the holes 142 to prevent undesirable affects on the pressure head within the combustion zone 138.

This secondary air sufficiently cools a wall portion 148 of the inner liner wall 134, which forms the downstream end of the combustion zone 138 and further forms an outlet 150 for the flow of high energy gas emitting from the combustion zone 138. If needed, further dilution air holes may be placed within the wall portion 148 in order to sufficiently lower the temperature of the gas stream leaving the outlet 150 to maintain safe temperatures within the turbine. As shown in FIG. 5, the flow leaving the outlet 150 enters the first stage turbine nozzle 139 which, of course, may be cooled by the remaining cooling air flowing through the passageways 118 and 122. The optimum positioning of both the primary and the secondary dilution air holes would, of course, be determined by combustor testing.

The above described combustors provide a number of basic advantages over conventional systems. The primary advantage, of course, is that the combustors are much shorter and lighter in weight. This is achieved even though the primary combustion flame stabilization is a well developed conventional type system and the secondary dilution air system utilizes the crossflow penetration of conventional designs. The shortened length of the combustors is achieved by means of a number of novel changes. As shown, these changes include combining the combustor inlet diffuser with the compressor OGV blade row such that diffuser turning starts within the compressor OGVs. In both of the above embodiments, the combustor dome overlaps with the major diffuser passage of the combustor. Again, in both embodiments, the diffuser flow approaches one corner of the combustor which reduces the amount of turning required. Also, the dilution region of the combustor is folded into the primary combustion zone in order to reduce the overall axial length while still maintaining conventional lengths for both the primary combustion zone and the secondary dilution zones.

While a number of preferred embodiments of applicant's device have been shown and described, it should be obvious that certain changes could be made in the described embodiments without departing from the broader aspects of applicant's invention. For example, the scroll cup fuel vaporizer shown in FIG. 3 could replace the atomizing fuel nozzles of FIG. 5, or vice versa. In either design the dome portion of the combustor could include cooling air holes or primary air delivery holes for delivery of air into the combustion zone. In light of the above, it is intended that the appended claims cover all such changes and modifications as fall within the broader concepts of applicant's disclosure.

I claim:
1. Combustion apparatus for a gas turbine engine, adapted to receive a gas stream from a compressor, to diffuse the gas stream, to ignite the gas stream along with high energy fuel, and to deliver a high energy gas stream to a turbine, said apparatus comprising:
an inner wall and an outer wall cooperating to form an inlet for receiving the gas stream for the compressor, said inlet having a plurality of stationary guide vanes located therein;
a closed end combustor formed of a dome member and a pair of liner walls extending in a generally parallel manner from said dome member to form a combustion zone having an open end opposite said dome member for delivering the high energy gas stream generated therein to the turbine;
means for providing a finally dispersed fuel spray to the interior of said combustor;
an annular splitter vane having a first wall extending along and spaced from said inner wall and a second wall extending along and spaced from said outer wall, said first and second walls being interconnected at their upstream ends, said splitter vane extending into the plane of said guide vanes and being supported thereby;
said inner and outer wall and said splitter vane cooperating to define a diffuser passage for the gas stream; and
said combustor being disposed at an angle with respect to said inlet whereby the diffused gas stream is initially directed at a corner of said combustor formed by the interconnection of said dome member and one of said liner walls.

2. Combustion apparatus as recited in claim 1 wherein said inner wall cooperates with one of said liner walls to form a first combination diffuser-cooling air passageway.

3. Combustion apparatus as recited in claim 2 wherein said outer wall cooperates with the remaining liner wall to form a second combination diffuser-cooling air passageway.

4. Combustion apparatus as recited in claim 3 wherein said splitter vane is positioned for delivering one portion of the gas stream to said first diffuser-cooling passageway and a second portion to said second diffuser-cooling passageway.

5. Combustion apparatus as recited in claim 4 wherein said annular splitter vane includes an open end opposite said interconnected end, said open end effectively surrounding said combustor corner.

6. Combustion apparatus as recited in claim 5 wherein said inner and outer line walls include a plurality of primary air holes for delivery of a portion of the gas stream from the first and second diffuser-cooling air passageways into the interior of said combustor.

7. Combustion apparatus as recited in claim 6 wherein said inner and outer liner walls further include a plurality of secondary air dilution slots for delivery of secondary air to the interior of said combustor.

8. Combustion apparatus as recited in claim 7 wherein the area of said diffuser-cooling air passageway is sufficient to provide a pressure drop of less than 7 percent across said secondary air dilution slots.

9. Combustion apparatus as recited in claim 7 wherein said fuel spray providing means comprises a scroll cup vaporizer having an inlet located within said first diffuser-cooling passageway.

10. Combustion apparatus as recited in claim 9 wherein said inner wall includes a lip portion which increases the area of said passageway immediately downstream of said vaporizer inlet.

11. Combustion apparatus as recited in claim 7 wherein said fuel spray providing means comprises an atomizing nozzle.

* * * * *